(12) United States Patent
Akimoto et al.

(10) Patent No.: US 11,586,981 B2
(45) Date of Patent: Feb. 21, 2023

(54) FAILURE ANALYSIS DEVICE, FAILURE ANALYSIS METHOD, AND FAILURE ANALYSIS PROGRAM

(71) Applicant: NEC Corporation, Tokyo (JP)

(72) Inventors: Ichirou Akimoto, Tokyo (JP); Yousuke Motohashi, Tokyo (JP); Naoki Sawada, Tokyo (JP); Daisuke Yokoi, Tokyo (JP); Masayuki Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 16/771,472

(22) PCT Filed: Dec. 11, 2017

(86) PCT No.: PCT/JP2017/044309
§ 371 (c)(1),
(2) Date: Jun. 10, 2020

(87) PCT Pub. No.: WO2019/116418
PCT Pub. Date: Jun. 20, 2019

(65) Prior Publication Data
US 2021/0019653 A1    Jan. 21, 2021

(51) Int. Cl.
*G06F 9/44* (2018.01)
*G06N 20/00* (2019.01)
(Continued)

(52) U.S. Cl.
CPC ........... *G06N 20/00* (2019.01); *G06F 11/079* (2013.01); *G06K 9/6234* (2013.01); *G06K 9/6256* (2013.01); *G06N 5/003* (2013.01)

(58) Field of Classification Search
CPC ....................................................... G06N 20/00
(Continued)

(56) References Cited

U.S. PATENT DOCUMENTS

| 2005/0216785 A1 | 9/2005 | Suzuki et al. |
| 2007/0180324 A1 | 8/2007 | Nakamura et al. |

(Continued)

FOREIGN PATENT DOCUMENTS

| CN | 106257872 A | 12/2016 |
| CN | 106301522 A | 1/2017 |

(Continued)

OTHER PUBLICATIONS

Eleni Rozaki, "Design and Implementation for Automated Troubleshooting using Data Mining", 2015, International Journal of Data Mining & Knowledge Management Process.*

(Continued)

*Primary Examiner* — Timothy A Mudrick

(57) ABSTRACT

A failure analysis device 10 is provided with an identification unit 11 that discriminates whether a predetermined failure has occurred on the basis of a learning model for discriminating the presence or absence of an occurrence of the predetermined failure learned by using a cause attribute which is associated with a cause of the predetermined failure and on the basis of a value of the attribute, and that identifies the cause of the predetermined failure discriminated to have occurred and countermeasures therefor.

16 Claims, 9 Drawing Sheets

(51) Int. Cl.
*G06F 11/07* (2006.01)
*G06K 9/62* (2022.01)
*G06N 5/00* (2023.01)

(58) Field of Classification Search
USPC .......................................................... 706/12
See application file for complete search history.

(56) References Cited

U.S. PATENT DOCUMENTS

| | | | |
|---|---|---|---|
| 2014/0222741 | A1 | 8/2014 | Eto et al. |
| 2019/0265657 | A1 | 8/2019 | Inagaki et al. |

FOREIGN PATENT DOCUMENTS

| | | | |
|---|---|---|---|
| CN | 106909478 | A | 6/2017 |
| JP | 2005-223906 | A | 8/2005 |
| JP | 2005-269238 | A | 9/2005 |
| JP | 2007-165721 | A | 6/2007 |
| JP | 2007-189644 | A | 7/2007 |
| JP | 2010-218301 | A | 9/2010 |
| JP | 2012-003713 | A | 1/2012 |
| JP | 2013-065084 | A | 4/2013 |
| JP | 2016-161475 | A | 9/2016 |
| JP | 2016-173782 | A | 9/2016 |
| JP | 2017-120649 | A | 7/2017 |
| JP | 2017-161991 | A | 9/2017 |
| WO | 2008/114863 | A1 | 9/2008 |

OTHER PUBLICATIONS

Extended European Search Report for EP Application No. 17934463.5 dated Nov. 18, 2020.
Eleni Rozaki: "Design and Implementation for Automated Network Troubleshooting Using Data Mining", International Journal of Data Mining & Knowledge Management Process, vol. 5, No. 3, May 23, 2015 (May 23, 2015), pp. 09-27, XP055748728, ISSN: 2231-007X, DOI: 10.5121/ijdkp.2015.5302.
C. Lee et al: "Migrating Fault Trees To Decision Trees For Real Time Fault Detection On International Space Station", Aerospace Conference, 2005 IEEE,Jan. 1, 2005 (Jan. 1, 2005), pp. 1-6, XP055748733, Piscataway, NJ, USA, DOI: 10.1109/AERO.2005.1559584, ISBN: 978-0-7803-8870-3.
Japanese Office Action for JP Application No. 2019-559425 dated May 11, 2021 with English Translation.
International Search Report for PCT Application No. PCT/JP2017/044309, dated Jan. 23, 2018.
Japanese Office Action for JP Application No. 2019-559425 dated Jun. 28, 2022 with English Translation.
Japanese Office Action for JP Application No. 2021-202972, dated Oct. 4, 2022 with English Translation.

* cited by examiner

FIG. 2

| DATE | TIME | ATTRIBUTE ||||||||| FAILURE OCCURRENCE INFORMATION |
| | | FIRST CAUSE ATTRIBUTE | SECOND CAUSE ATTRIBUTE | THIRD CAUSE ATTRIBUTE | FOURTH CAUSE ATTRIBUTE | FIFTH CAUSE ATTRIBUTE | MODEL | WEEKDAY | HUMIDITY | AMOUNT OF TRAFFIC | ... | LOW THROUGHPUT OCCURRENCE |
|---|---|---|---|---|---|---|---|---|---|---|---|---|
| 1/1 | 0:00 | 1 | 0 | 0 | 0 | 0 | 1 | No | 40 | 3 | | 1 |
| | 0:15 | 1 | 0 | 0 | 0 | 0 | 1 | No | 40 | 3 | | 1 |
| | 0:30 | 1 | 0 | 0 | 0 | 0 | 1 | No | 40 | 3 | | 1 |
| | 0:45 | 1 | 0 | 0 | 0 | 0 | 1 | No | 40 | 3 | | 1 |
| | ... | | | | | | | | | | | |
| 1/2 | 0:00 | 0 | 0 | 0 | 0 | 0 | 1 | No | 42 | 10 | | 0 |
| | 0:15 | 0 | 0 | 0 | 0 | 0 | | No | 42 | 10 | | 0 |
| | 0:30 | 0 | 0 | 0 | 0 | 0 | | No | 42 | 10 | | 0 |
| | 0:45 | 0 | 0 | 0 | 0 | 0 | | No | 42 | 10 | | 0 |
| | ... | | | | | | | | | | | |

FIRST CAUSE ATTRIBUTE: CHANNEL DISCONNECTION OR ERROR CONTINUED FOR SIX HOURS OR MORE
SECOND CAUSE ATTRIBUTE: SIGNIFICANT FLUCTUATIONS IN RADIO WAVE RECEPTION INTENSITY
THIRD CAUSE ATTRIBUTE: OCCURRENCE OF PACKET LOSS IN STATUS WHERE NO CHANNEL DISCONNECTION HAS OCCURRED
FOURTH CAUSE ATTRIBUTE: OCCURRENCE OF PACKET LOSS AT BANDWIDTH USAGE RATE OF PREDETERMINED THRESHOLD OR MORE
FIFTH CAUSE ATTRIBUTE: SUDDEN TRAFFIC CHANGE FROM PREVIOUS WEEK

FIG. 3

| CAUSE OF LOW THROUGHPUT FAILURE | CAUSE ATTRIBUTE FOR DETERMINATION | COUNTERMEASURES |
|---|---|---|
| ANTENNA MISORIENTATION | • CHANNEL DISCONNECTION OR ERROR CONTINUED FOR SIX HOURS OR MORE<br>• RECEPTION LEVEL DROPPED BELOW NORMAL THRESHOLD<br>• WEATHER DEPENDENCE IS LOW | 1. DISPATCH ENGINEER TO SITE |
| FREQUENT OCCURRENCE OF AUTOMATIC OPTIMIZATION FUNCTION OF MODULATION METHOD IN RADIO CHANNELS (QUALITY DEGRADATION) | • SIGNIFICANT FLUCTUATIONS IN RADIO WAVE RECEPTION INTENSITY<br>• SPORADIC OCCURRENCE OF PERFORMANCE MONITOR ERRORS<br>• WEATHER DEPENDENCE IS HIGH | 1. SPEED ENHANCEMENT<br>2. ANTENNA REPLACEMENT/ORIENTATION ADJUSTMENT OF ANTENNA<br>3. CABLE REPLACEMENT |
| OCCURRENCE OF Burst Traffic | • OCCURRENCE OF PACKET LOSS IN STATUS WHERE NO CHANNEL DISCONNECTION HAS OCCURRED | 1. SPEED ENHANCEMENT<br>2. QoS CONFIGURATION IN COUNTERPART DEVICE |
| QoS MISCONFIGURATION | • OCCURRENCE OF PACKET LOSS AT BANDWIDTH USAGE RATE OF PREDETERMINED THRESHOLD OR MORE | 1. CONFIGURATION CHANGE |
| OCCURRENCE OF EVENT, OCCURRENCE OF MALFUNCTION/FAILURE IN SITUATION OTHER THAN IN DEVICE CONCERNED | • SUDDEN TRAFFIC CHANGE FROM PREVIOUS WEEK | 1. CONFIRMATION OF IMPLEMENTATION OF CAMPAIGNS<br>2. CONFIRMATION FROM MANAGEMENT DEPARTMENT FOR OTHER DEVICES |

FAILURE ANALYSIS DEVICE, FAILURE ANALYSIS METHOD, AND FAILURE ANALYSIS PROGRAM

This application is a National Stage Entry of PCT/JP2017/044309 filed on Dec. 11, 2017, the contents of all of which are incorporated herein by reference, in their entirety.

TECHNICAL FIELD

The present invention relates to a failure analysis device, a failure analysis method, and a failure analysis program.

BACKGROUND ART

FIG. 9 is a block diagram showing a configuration example of a communication system used to provide a communication service. As shown in FIG. 9, the communication system includes paired communication devices. The communication system is communicably connected to a base station and a router.

In the above-described communication systems which are in operation in various parts of the world, various failures sometimes occur during operation of the systems. Examples of failures that occur include a low throughput failure in which packet data transmitted through a communication system is transferred only at a throughput that is a designed throughput or less.

Examples of failures also include a packet loss in which a part of packet data carried through the communication system is lost. Examples further include a zero traffic failure in which substantially no packet data is transferred between a transmitter and a receiver.

In order to promptly handle a failure that has occurred, it is important to promptly identify the cause of the failure. In the present specification, the cause of a failure is classified into either an "internal cause" or an "external cause".

The "internal cause" corresponds to a cause that has emerged between paired communication devices, for example. Specifically, an example of a possible internal cause is a situation including an inappropriate orientation relationship between the antenna provided in one communication device and the antenna provided in the other communication device.

Possible internal causes also include a situation in which an obstacle such as a tree exists in Line-of-Sight (LOS) and an occurrence of radio interference in which interference occurs on radio waves between the paired communication devices.

Other possible internal causes include frequent occurrence of an automatic optimization function for modulation schemes in radio channels (quality degradation), occurrence of burst traffic, and misconfiguration of Quality of Service (QoS).

The "external cause" corresponds to a cause occurring outside the paired communication devices (in other words, occurring at a location other than between the paired communication devices). A specific example of an external cause can be a malfunction of a router or a base station communicably connected to the communication system.

Another example of an external cause is a case of receiving data not intended to be received, such as data including a computer virus. In addition, events peculiar to the region in which the communication system is installed, such as an event that can hinder radio communication, are also considered as external causes.

As described above, many candidates can be present as causes of a failure that occurs during the operation of the communication system. The method of manually verifying each of candidate as to whether a possible candidate is a real cause would require a lot of time, and thus is not a method to be practically adopted.

Techniques of generating a model capable of analyzing the cause of a failure or techniques of generating a model capable of predicting occurrence of a failure are described in Patent Literatures (PTLs) 1 to 3, for example.

PTL 1 discloses an abnormality occurrence cause identifying device that assumes a plurality of causes as causes of an abnormality occurring in a connected terminal, preliminarily learns a state of the terminal emerging due to the assumed cause, and collects, from each of connected terminals, information indicating the state of each of the connected terminals.

When an abnormality is detected in the abnormality detection device, the abnormality occurrence cause identifying device described in PTL 1 estimates which of the learned states is closest to the state of the terminal related to the occurrence of the abnormality by a discrimination analysis based on statistics, and identifies the cause to which the state belongs as a cause of the occurrence of the abnormality.

Furthermore, PTL 2 describes a network failure estimation method of searching a case database using an input failure site and failure phenomenon as search keys, estimating the cause of the failure on the basis of a cause site and frequency of the case record obtained by the search, and presenting the result.

Moreover, PTL 3 discloses a malfunction prediction system that generates a learning model that predicts a malfunction of a monitored device using time-series sensor data received by a learning server, as training data.

When a malfunction occurs in the monitored device, the failure prediction device described in PTL 3 transmits, to a learning server, time-series sensor data regarding states before the malfunction occurred in the monitored device. In addition, the malfunction prediction device uses the learning model and predicts the probability of malfunction of the monitored device using the time-series sensor data received from the monitored device as an input.

PTL 4 describes an example of a learner to generate a learning model using a heterogeneous mixture learning technique.

CITATION LIST

Patent Literature

PTL 1: Japanese Patent Application Laid-Open No. 2007-189644
PTL 2: Japanese Patent Application Laid-Open No. 2005-269238
PTL 3: Japanese Patent Application Laid-Open No. 2016-173782
PTL 4: US Patent Application Publication No. 2014/0222741

SUMMARY OF INVENTION

Technical Problem

In a case where there is a possibility that a failure has occurred, it is preferable that the cause can be identified promptly. Furthermore, it is preferable that a countermeasure for the identified cause can be identified together.

OBJECT OF THE INVENTION

Therefore, the present invention aims to provide a failure analysis device, a failure analysis method, and a failure analysis program capable of promptly identifying a cause of the failure that has occurred and countermeasures therefor, capable of solving the above-described problems.

Solution to Problem

A failure analysis device according to the present invention includes an identification unit which discriminates whether a predetermined failure has occurred on the basis of a learning model for discriminating the presence or absence of an occurrence of the predetermined failure learned by using a cause attribute which is associated with a cause of the predetermined failure and on the basis of a value of the attribute, and that identifies the cause of the predetermined failure discriminated to have occurred and countermeasures therefor.

A failure analysis method according to the present invention includes: discriminating whether a predetermined failure has occurred on the basis of a learning model for discriminating the presence or absence of an occurrence of the predetermined failure learned by using a cause attribute which is associated with a cause of the predetermined failure and on the basis of a value of the attribute; and identifying the cause of the predetermined failure discriminated to have occurred and countermeasures therefor.

A failure analysis program according to the present invention causes a computer to execute: a discrimination process of discriminating whether a predetermined failure has occurred on the basis of a learning model for discriminating the presence or absence of an occurrence of the predetermined failure learned by using a cause attribute which is associated with a cause of the predetermined failure and on the basis of a value of the attribute; and an identifying process of identifying the cause of the predetermined failure discriminated to have occurred and countermeasures therefor.

Advantageous Effects of Invention

According to the present invention, it is possible to promptly identify a cause of the failure that has occurred and countermeasures therefor.

BRIEF DESCRIPTION OF DRAWINGS

FIG. 2 is an explanatory diagram showing an example of training data stored in a data storage unit 102.

FIG. 3 is an explanatory diagram showing an example of a cause of a failure, a cause attribute, and a countermeasure for the failure.

DESCRIPTION OF EMBODIMENTS

First Exemplary Embodiment

[Description of Configuration]

Figure 1:
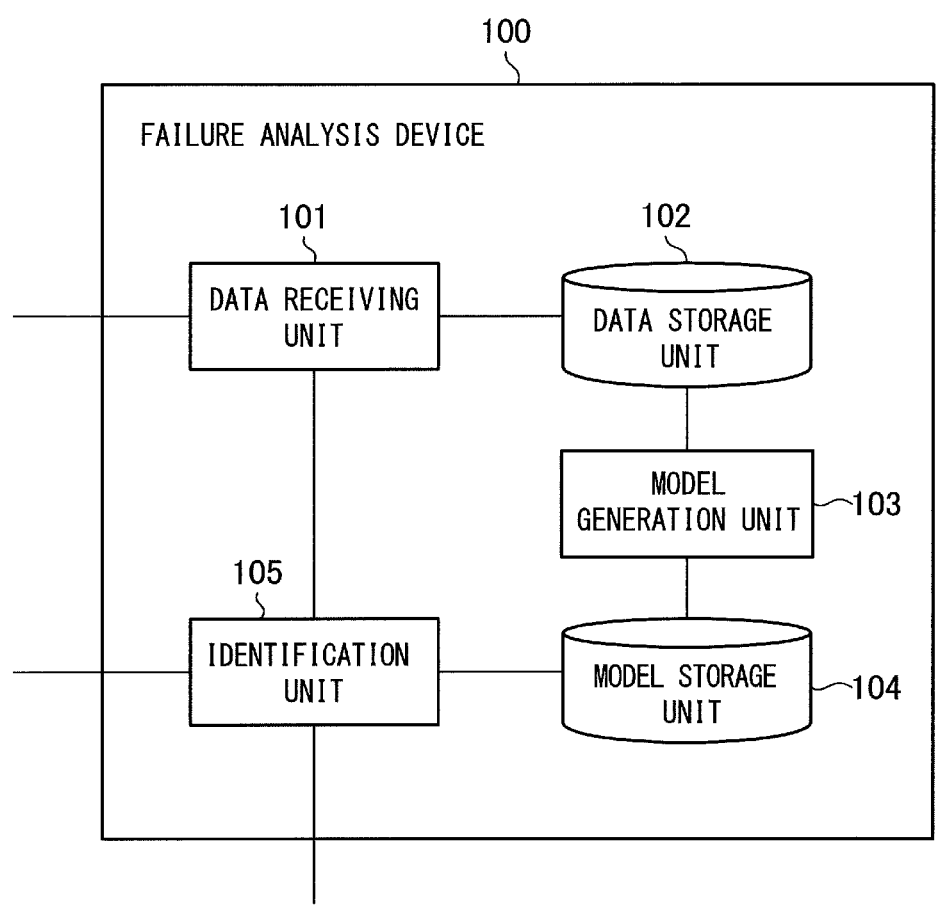
FIG. 1 is a block diagram showing a configuration example of a failure analysis device according to a first exemplary embodiment of the present invention.

Hereinafter, exemplary embodiments of the present invention will be described with reference to the drawings. FIG. 1 is a block diagram showing a configuration example of a failure analysis device according to a first exemplary embodiment of the present invention.

As shown in FIG. 1, a failure analysis device 100 according to the present exemplary embodiment includes a data receiving unit 101, a data storage unit 102, a model generation unit 103, a model storage unit 104, and an identification unit 105.

The data receiving unit 101 has a function of receiving acquisition target data transmitted from a failure analysis target device. For example, the data receiving unit 101 receives log information output from a network device used in mobile communication at predetermined time intervals.

The data receiving unit 101 inputs the received data to the data storage unit 102. The data receiving unit 101 further inputs the data received when there is a possibility that a failure such as a packet loss has occurred, to the identification unit 105.

The data storage unit 102 has a function of storing data input from the data receiving unit 101, as training data. The data storage unit 102 stores past log information regarding a failure analysis target device and information regarding the presence or absence of occurrence of a failure.

FIG. 2 is an explanatory diagram showing an example of training data stored in a data storage unit 102. A part of the training data stored in the data storage unit 102 includes information indicating details of a past failure, a failure that occurred in the past.

The training data shown in FIG. 2 includes date, time, an attribute, and failure occurrence information. The date and time correspond to the date and time on which the failure analysis target device recorded the acquisition target data.

As shown in FIG. 2, the attributes include a cause attribute and a non-cause attribute. The cause attribute includes a "first cause attribute" to a "fifth cause attribute".

In the present exemplary embodiment, an attribute associated with a cause is referred to as a cause attribute. FIG. 3 is an explanatory diagram showing an example of a cause of a failure, a cause attribute, and a countermeasure for the failure. The causes of the failure shown in FIG. 3 are all causes of a low throughput failure.

As shown in FIG. 3, an administrator preliminarily defines an attribute corresponding to a cause as a cause attribute, for each of causes of a low throughput failure. Furthermore, the administrator also preliminarily defines a countermeasure corresponding to the cause. The administrator causes the model storage unit 104 to store information indicating a predefined relationship, for example.

For example, the administrator associates a cause "antenna misorientation" with cause attributes such as "channel disconnection or error continued for six hours or more" or "reception level dropped below normal threshold" and with a countermeasure "dispatching engineer to site".

Note that, as shown in FIG. 3, the "weather dependence is low" is described for the cause of "antenna misorientation", leading to a relatively small cause attribute value indicating the weather dependence in a trained model.

In addition, the administrator associates a cause "frequent occurrence of an automatic optimization function for modulation schemes in radio channels (quality degradation)" with cause attributes such as "significant fluctuations in radio wave reception intensity" or "sporadic occurrence of performance monitor errors" and with countermeasures such as "speed enhancement" and "antenna replacement/orientation adjustment of antenna".

As shown in FIG. 3, the "weather dependence is high" is described for the cause of "frequent occurrence of an automatic optimization function for modulation schemes in radio channels (quality degradation)", leading to a relatively large cause attribute value indicating the weather dependence in a trained model.

In addition, the administrator associates the cause "burst traffic occurrence" with a cause attribute "occurrence of packet loss in status where no channel disconnection has occurred" and with countermeasures such as "speed enhancement" and "QoS configuration in counterpart device".

In addition, the administrator associates the cause "QoS misconfiguration" with the cause attribute "occurrence of packet loss at a bandwidth usage rate of a predetermined threshold or more" and with the countermeasure "configuration change".

The administrator also associates the cause "occurrence of event or occurrence of malfunction/failure in situation other than in the device concerned" with the cause attribute "sudden traffic change from previous week", and with countermeasures such as "confirmation of implementation of campaigns, or the like" and "confirmation from management department for other devices". The administrator stores information indicating the above-described each of correspondences in the model storage unit 104, for example.

As shown in FIG. 2, the "first cause attribute" is "channel disconnection or error continued for six hours or more". The "first cause attribute" has either "1" or "0" recorded on the basis of a performance monitor and traffic information. Each of performance monitor and traffic information is information indicating performance of the radio communication being implemented.

For example, in a case where it is confirmed from the performance monitor and the traffic information that channel disconnection or an error has continuously occurred in radio communication for six hours or more, "1" is recorded in the "first cause attribute".

Furthermore, in a case where it is not confirmed from the performance monitor and the traffic information that channel disconnection or an error has continuously occurred in radio communication for six hours or more, "0" is recorded in the "first cause attribute". Similarly, either "1" or "0" is recorded in each of "second cause attribute" to "fifth cause attribute".

Although "0" or "1" is recorded in the cause attribute shown in FIG. 2, an attribute for which a real number can be recorded may be defined as the cause attribute.

Moreover, examples of non-cause attributes include "model", "weekdays", "humidity", and "traffic amount".

The "model" includes a record such as "1" for the model of the failure analysis target device. Records of models use inventory information, which is information indicating the location, model, and configuration of a failure analysis target device.

Furthermore, it is allowable to record, using the inventory information, for example, information indicating the location of a failure analysis target device, such as a cold region, in the training data. Furthermore, information indicating the configuration of the failure analysis target device, such as the fact that the configuration includes special content, may be recorded in the training data.

The "weekday" includes distinction as to whether the data is recorded on a weekday. "Yes" is recorded at "weekday" for the data recorded on a weekday. "No" is recorded at "weekday" for the data recorded on a non-weekday.

The record of whether the data is recorded on a weekday uses calendar information which is information including the day of the week of each of dates, the day of the week corresponding to a holiday, the date corresponding to a national holiday, and the date of an event (for example, a day of an annual event such as Christmas or Halloween).

The calendar information is used to judge whether the date is a holiday or a weekday. Furthermore, the calendar information enables judgment as to whether the date falls on a holiday or on an annual event day.

The "humidity" includes a record of the humidity (40(%), for example) of the day on which the acquisition target data was recorded in a region where the device is installed. The record of the humidity uses weather information indicating information regarding the weather of the region where the failure analysis target device is installed.

The weather information includes, for example, information indicating a type such as "sunny", "cloudy" or "rainy", as well as precipitation, temperature, and humidity. These pieces of information are examples, and the weather information used in each of devices need not include all of the exemplified weather information. Furthermore, other information as weather information may be included in the weather information used in each of the devices.

The "traffic amount" includes a record of the traffic in radio communication executed on the failure analysis target device. The record of the traffic amount uses a performance monitor and traffic information.

In addition to inventory information, calendar information, weather information, performance monitor, and traffic information, it is allowable to generate training data using event information indicating the presence or absence of occurrence of an event and campaign information indicating the presence or absence of a campaign.

Moreover, training data may be generated using network topology information indicating a relationship between devices or channel quality information indicating the quality of a network channel between the devices. The network topology information is specifically expressed as an effective graph indicating a connection relationship between the devices and a direction of a flow of traffic between the connected devices.

With the use of the network topology information, for example, information indicating an attribute of an adjacent device (a device that is further adjacent to an adjacent device) is recorded in the training data. Moreover, the network topology information may include, for example, the connection mode (star type, bidirectional type, ring type, or the like) between a model generation target device and another device, the communication method (radio, optical, or the like), the number of connected devices, or the like.

Moreover, training data may be generated using information indicating demographics of the region in which the device is installed. In a case where urban planning is defined, it is allowable to use the urban planning as information indicating demographics. Urban planning can be defined as one mode of information indicating demographics.

The failure occurrence information is information indicating the presence or absence of occurrence of a failure. FIG. 2 shows "low throughput occurrence" indicating the presence or absence of a low throughput failure as an example of the failure occurrence information. Note that the failure occurrence information may indicate, for example, one of the presence or absence of occurrence of packet loss, the presence or absence of occurrence of QoS loss (Discard) failure, the presence or absence of occurrence of a radio loss failure or the presence or absence of occurrence of a radio link down failure.

The failure occurrence information uses information indicating the presence or absence of occurrence of a failure that needs specification of a countermeasure. The present exemplary embodiment describes an exemplary case of identifying a countermeasure for a low throughput failure.

For example, in a case where a low throughput failure has occurred, "1" is recorded in the low throughput occurrence. In a case where no low throughput failure has occurred, "0" is recorded in the low throughput occurrence.

Note that the processing of converting the data acquired by the data receiving unit 101 into values to be recorded in the training data shown in FIG. 2 may be executed by either the data receiving unit 101 or the data storage unit 102.

The model generation unit 103 has a function of performing learning to obtain a model that identifies occurrence of a predetermined failure, by using the training data stored in the data storage unit 102. Hereinafter, a model obtained by execution of learning by the model generation unit 103 using the training data is referred to as a learning model.

For example, in a case of performing learning to obtain a learning model for discriminating the presence or absence of occurrence of a low throughput failure, the model generation unit 103 uses training data corresponding to the time of occurrence of the low throughput failure and training data corresponding to the time of non-occurrence of a low throughput failure at a predetermined ratio (for example, 1:1).

The model generation unit 103 generates a learning model in which a value of each of attributes is assigned to an explanatory variable corresponding to the attribute. By the generation of a learning model, an explanatory variable having a coefficient larger than a coefficient (weight) of other explanatory variables will be identified as an explanatory variable having a large influence on the occurrence of a failure. In the present exemplary embodiment, a cause of the failure that has occurred is identified on the basis of the cause attribute corresponding to the identified explanatory variable.

Hereinafter, three types of learning models generated by the model generation unit 103 of the present exemplary embodiment will be described.

(1) Learning model obtained by heterogeneous mixture learning

Figure 4:
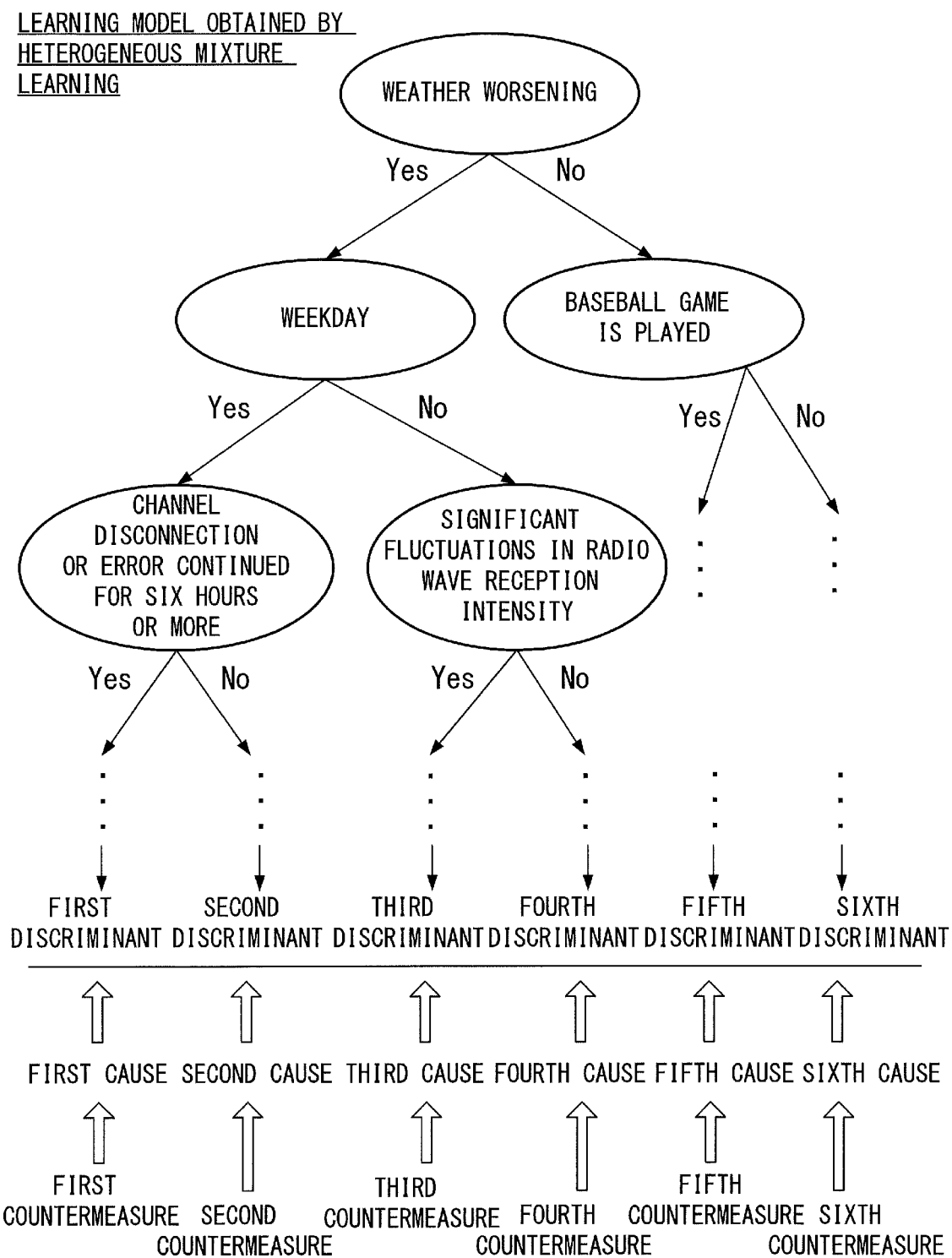
FIG. 4 is an explanatory diagram showing an example of a learning model obtained by heterogeneous mixture learning, generated by a model generation unit 103.

The model generation unit 103 can generate a learning model by performing heterogeneous mixture learning described in PTL 4. FIG. 4 is an explanatory diagram showing an example of a learning model generated by the model generation unit 103 through heterogeneous mixture learning. The ellipses shown in FIG. 4 indicates branching under conditions corresponding to attributes (explanatory variables). The condition used in branching is called a gate function.

As shown in FIG. 4, the learning model obtained by the heterogeneous mixture learning is a learning model expressed in a binary tree format. The binary tree includes nodes indicating branching under conditions corresponding to attributes and leaf nodes indicating discriminants.

That is, the model generation unit 103 generates a learning model in which an appropriate discriminant is presented after branching is performed a plurality of times under conditions corresponding to each of attributes. In the example shown in FIG. 4, after determinations are made from the attribute such that "weather worsening"→"weekday"→"channel disconnection or error continued for six hours or more"→ . . . , the learning model presents a first discriminant. A discriminant is an equation represented as below, for example.

$$y = a_1 \cdot x_1 + a_2 \cdot x_2 + \ldots + a_n \cdot x_n + b \qquad \text{Equation (1)}$$

Note that $x_1$ to $x_n$ in Equation (1) correspond to explanatory variables, and y corresponds to an objective variable. Furthermore, $a_1$ to $a_n$ in Equation (1) are coefficients of explanatory variables, and b is a constant term.

Each of the presented discriminants is a discriminant indicating the presence or absence of occurrence of a low throughput failure. For example, in a case where a value close to "1" is obtained from the first discriminant to which the attribute value has been given, it is identified that a low throughput failure has occurred.

Note that there is no need to use all attributes in the training data as gate functions. For example, the attribute used in the gate function may be limited to the cause attribute alone, or there is no need to particularly limit the attribute used in the gate function.

(2) Decision Tree

Figure 5:
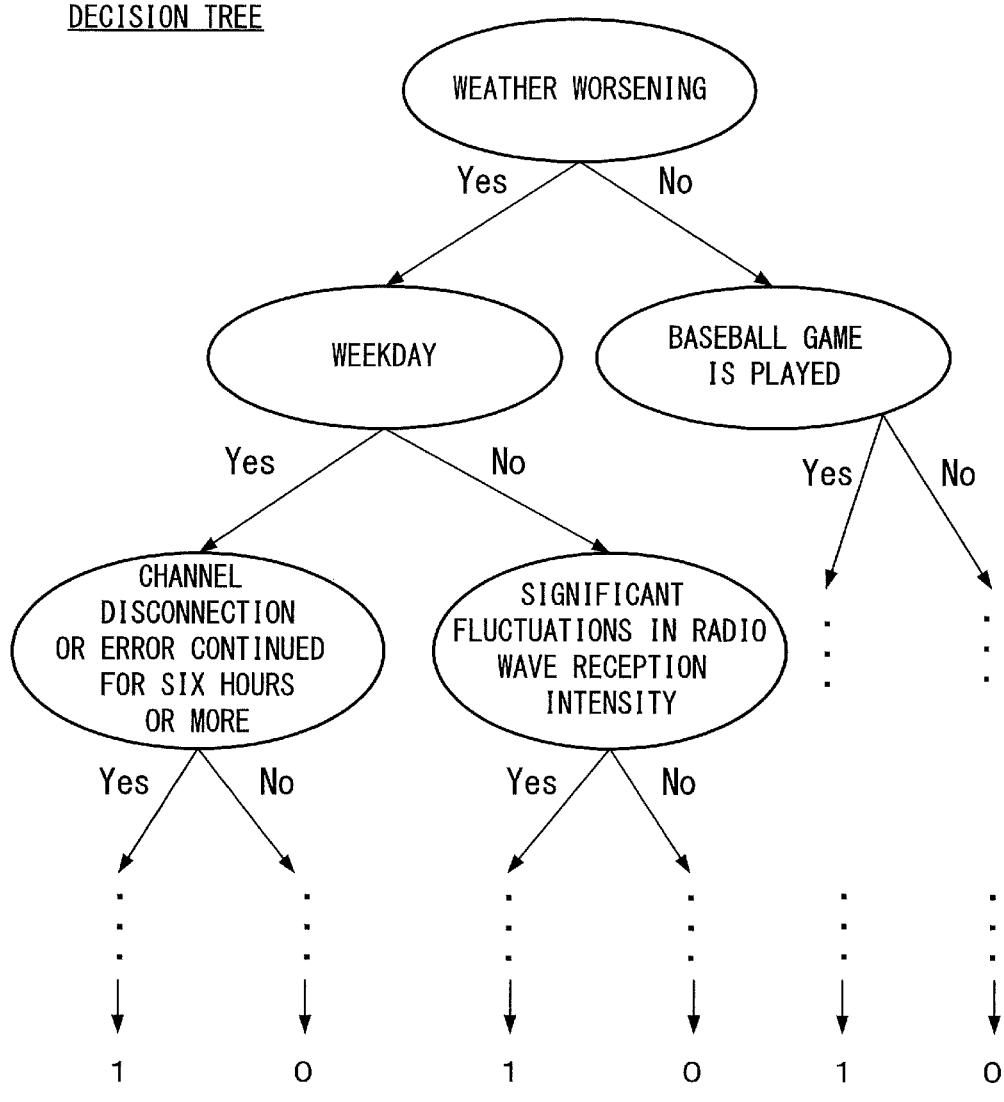
FIG. 5 is an explanatory diagram showing an example of a decision tree generated by the model generation unit 103.

The model generation unit 103 may generate a decision tree instead of a learning model obtained by heterogeneous mixture learning. FIG. 5 is an explanatory diagram showing an example of a decision tree generated by the model generation unit 103. The ellipses shown in FIG. 5 indicates branching under conditions corresponding to attributes.

As shown in FIG. 5, the decision tree includes nodes indicating branching under conditions corresponding to attributes and leaf nodes indicating the presence or absence of occurrence of a failure.

That is, the model generation unit 103 generates a learning model that determines the presence or absence of occurrence of a failure after branching is performed a plurality of times under conditions corresponding to each of attributes. In the example shown in FIG. 5, after determinations are made from the attribute such that "weather worsening"→"weekday"→"channel disconnection or error continued for six hours or more"→ . . . , the learning model determines that a low throughput failure has occurred.

In addition, each of the leaf nodes indicating "1" in the decision tree shown in FIG. 5 corresponds to occurrence of a low throughput failure. For example, in a case where a learning model to which an attribute value is given presents a leaf node indicating "1", it is identified that a low throughput failure has occurred. The decision tree is a model used in a case where subdivision of cause of a failure is not required as much as in the learning model obtained by the heterogeneous mixture learning shown in FIG. 4.

(3) Discriminant

Instead of generating a tree structure model such as a learning model obtained by heterogeneous mixture learning, or a decision tree, the model generation unit 103 may simply generate a discriminant such as Equation (1).

For example, in a case where a value being a predetermined value (for example, 0.5) or more is obtained from the discriminant to which the attribute value is given, it is allowable to identify that a low throughput failure has occurred.

The number of terms in the generated discriminant is larger than that in the discriminant in the learning model obtained by heterogeneous mixture learning. The discriminant is a model used in cases where the number of types of attributes is relatively small.

Although the three types of learning models generated by the model generation unit 103 have been described above, the model generation unit 103 may generate other types of learning models.

Furthermore, the learning model generated by the model generation unit 103 may present the type of the cause of a failure such as the above-described "internal cause" or "external cause" instead of the cause of the failure. The model generation unit 103 stores the generated learning model in the model storage unit 104.

The identification unit 105 identifies a cause of a failure corresponding to each of discriminants generated in a learning model obtained by heterogeneous mixture learning stored in the model storage unit 104, as well as identifying a countermeasure for the cause of the failure. For example, the identification unit 105 identifies a cause associated with a cause attribute corresponding to an explanatory variable having a coefficient of a threshold or more in a discriminant as well as identifying a countermeasure.

For example, in a case where the coefficient of the explanatory variable corresponding to the cause attribute is a threshold or more in the discriminant, the identification unit 105 identifies a cause and a countermeasure corresponding to the cause attribute, as a cause and a countermeasure corresponding to the discriminant.

For example, here is an exemplary case where $x_1$ corresponds to a cause attribute of "channel disconnection or error continued for six hours or more". Furthermore, it is assumed that the coefficient $a_1$ is a threshold or more in the first discriminant. In this case, the identification unit 105 identifies each of "antenna misorientation" and "dispatching engineer to site" respectively as a cause and a countermeasure corresponding to the first discriminant on the basis of the correspondence shown in FIG. 3 and then adds the identified result to the learning model.

Furthermore, the identification unit 105 identifies the cause of the failure corresponding to each of the leaf node indicating "1" in the decision tree stored in the model storage unit 104, and a countermeasure for the cause of the failure. When there is a cause attribute among the attributes represented by the nodes from the leaf node indicating "1" to the root node, the identification unit 105 identifies each of a cause and a countermeasure corresponding to the cause attribute, and then adds the identified result to the learning model.

Note that the identification unit 105 does not need to add the cause and the countermeasure for the leaf node indicating "0" to the learning model.

Furthermore, the identification unit 105 identifies a cause of the failure corresponding to the discriminant stored in the model storage unit 104 as well as identifying a countermeasure for the cause of the failure. For example, in a case where the coefficient of the explanatory variable corresponding to the cause attribute is a threshold or more in the discriminant, the identification unit 105 identifies a cause and a counter-measure corresponding to the cause attribute, as a cause and a countermeasure corresponding to the discriminant. The identification unit 105 adds the identified cause and the countermeasure to the learning model.

Furthermore, the identification unit 105 has a function of identifying whether a failure (in this example, a low throughput failure) has occurred, a cause of the failure, and a countermeasure corresponding to the cause by using the learning model stored in the model storage unit 104. The data obtained at the time when there is a possibility of occurrence of a failure is input to the identification unit 105 from the data receiving unit 101. The format of the input data is similar to the format of the data shown in FIG. 2, for example.

The identification unit 105 identifies whether a failure (low throughput failure) has occurred on the basis of the value of the attribute contained in the input data and the learning model. In a case where a failure has occurred, the identification unit 105 identifies a cause of the failure and a countermeasure therefor which have been added.

In the case of using a learning model obtained by heterogeneous mixture learning, the identification unit 105 selects a discriminant to be used according to the branching in a tree structure. Next, the identification unit 105 assigns the value of the attribute to the explanatory variable of the selected discriminant. For example, here it is assumed that the first discriminant is selected.

For example, in a case where a value close to "1" is obtained from the first discriminant to which the value of the attribute is assigned, the identification unit 105 identifies that a low throughput failure has occurred. In another case where a value close to "0" is obtained from the first discriminant to which the attribute value is assigned, the identification unit 105 does not identify that a low throughput failure has occurred.

For example, in a case where a value of 0.5 or more is obtained from the first discriminant, the identification unit 105 identifies that a low throughput failure has occurred. In a case where a value less than 0.5 is obtained from the first discriminant, the identification unit 105 does not identify that a low throughput failure has occurred.

After identifying that a low throughput failure has occurred, when the coefficient of the explanatory variable corresponding to the cause attribute is a threshold or more, the identification unit 105 identifies the added cause (cause of low throughput failure) that has been associated with the cause attribute. The identification unit 105 also identifies the added countermeasure (countermeasure for a low throughput failure).

In a case of using a decision tree, the identification unit 105 selects a leaf node following the branching in the tree structure. For example, in a case where the leaf node indicating "1" is selected, the identification unit 105 identifies that a low throughput failure has occurred. In a case where the leaf node indicating "0" is selected, the identification unit 105 identifies that a low throughput failure has not occurred.

After identifying that a low throughput failure has occurred, the identification unit 105 identifies the added cause of the low throughput failure on the basis of the cause attribute corresponding to the branching condition indicated by the nodes through which the selection of the leaf node is selected. In addition, the identification unit 105 also identifies a countermeasure that has already been added to the identified cause of the failure.

In the case of using the discriminant, the identification unit 105 assigns the value of the attribute to the explanatory variable of the discriminant. For example, in a case where a value being a predetermined value or more is obtained from the discriminant, the identification unit 105 identifies that a low throughput failure has occurred. In a case where a value close to 0 is obtained from the discriminant, the identification unit 105 identifies that a low throughput failure has not occurred.

For example, in a case where a value of 0.5 or more is obtained from the discriminant, the identification unit 105 identifies that a low throughput failure has occurred. In a case where a value less than 0.5 is obtained from the discriminant, the identification unit 105 does not identify that a low throughput failure has occurred.

After identifying that a low throughput failure has occurred, when the coefficient of the explanatory variable corresponding to the cause attribute is a threshold or more, the identification unit 105 identifies the added cause (cause of low throughput failure) that has been associated with the cause attribute. The identification unit 105 also identifies the added countermeasure (countermeasure for a low throughput failure).

In addition to the above example, the model generation unit 103 of the failure analysis device 100 according to the present exemplary embodiment may set the explanatory variable to the number of connected users and the traffic amount in the past log information regarding the target device and may set the objective variable to the presence or absence of packet loss, and may perform learning to obtain the model using the heterogeneous mixture learning technique.

When a packet loss occurs in the target device, the identification unit 105 gives the value of the attribute contained in the log information obtained at the time when there is a possibility of occurrence of a packet loss, to the learning model. Since the discriminant is selected on the basis of the value of the given attribute, the identification unit 105 identifies an explanatory variable having a large influence on the occurrence of packet loss in the selected discriminant.

Note that when the countermeasure is a design change, the failure analysis device 100 of the present exemplary embodiment may include a failure handling unit that executes the identified countermeasure. The failure handling unit may automatically execute the identified countermeasure on a network device or the like.

For example, the failure handling unit issues a change command, a script, or the like to execute a design change. The failure analysis device 100 including the failure handling unit is capable of automatically resolve the failure by analyzing the received data to determine the cause of the failure and executing a countermeasure corresponding to the cause.

[Description of Operation]

Figure 6:
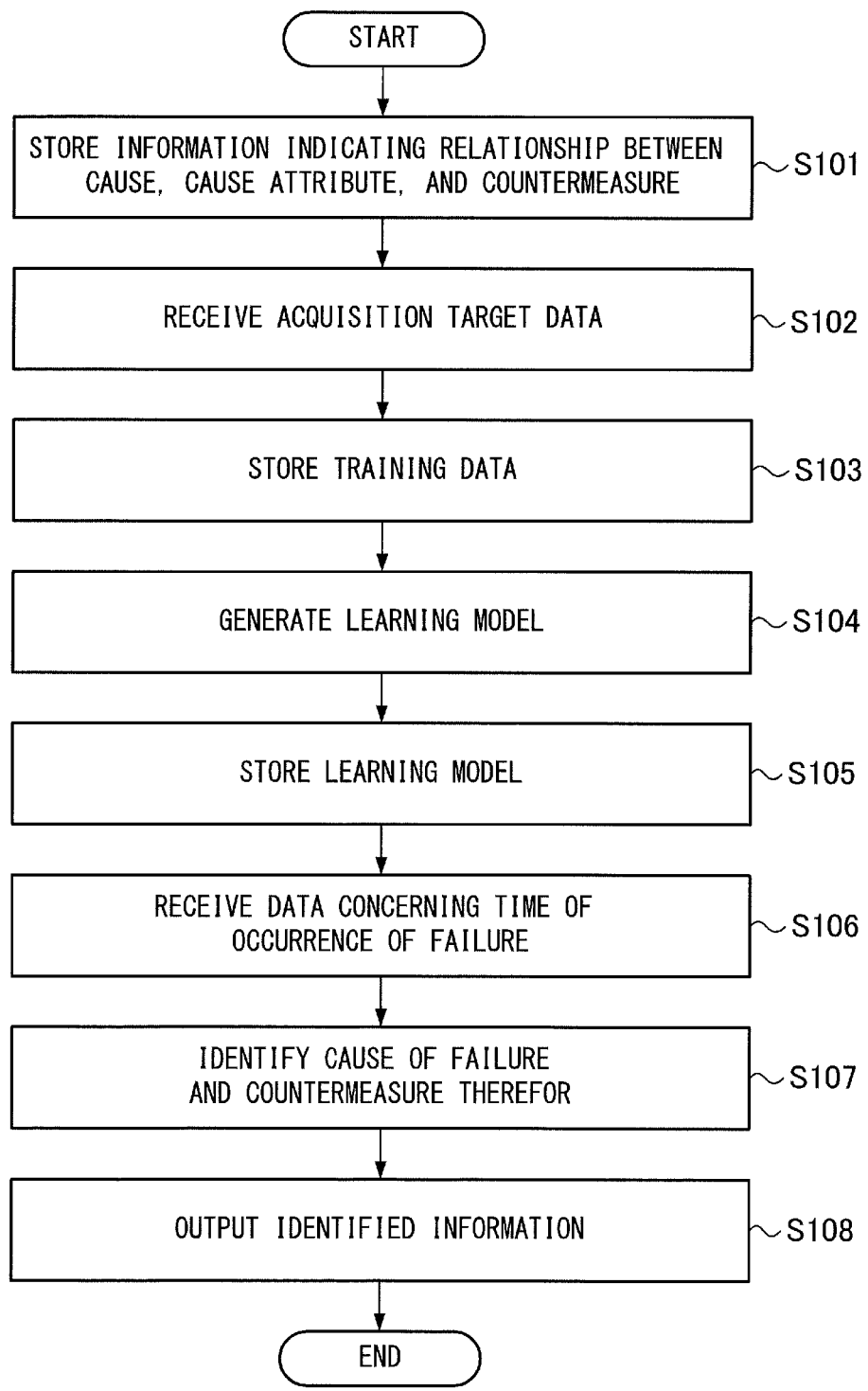
FIG. 6 is a flowchart showing operation of a failure analysis process performed by a failure analysis device 100 according to the first exemplary embodiment.

Hereinafter, failure analysis operation of the failure analysis device 100 of the present exemplary embodiment will be described with reference to FIG. 6. FIG. 6 is a flowchart showing operation of a failure analysis process performed by the failure analysis device 100 according to the first exemplary embodiment.

An administrator preliminarily defines the correspondence between a cause attribute and a countermeasure for each of causes of a low throughput failure. The administrator stores information indicating the defined correspondence in the model storage unit 104 (step S101).

Next, the data receiving unit 101 receives acquisition target data transmitted from the failure analysis target device (step S102). Next, the data receiving unit 101 inputs the received data to the data storage unit 102.

Next, the data storage unit 102 stores training data using the data input from the data receiving unit 101, the correspondence stored in the model storage unit 104, or the like. The data storage unit 102 accumulates the training data (step S103).

Next, the model generation unit 103 executes learning using the training data stored in the data storage unit 102 and thereby generates a learning model (step S104).

The model generation unit 103 generates one of a learning model obtained by heterogeneous mixture learning, a decision tree, or a discriminant, as a learning model. Next, the model generation unit 103 stores the generated learning model in the model storage unit 104 (step S105).

Next, the data receiving unit 101 receives the data, transmitted from the failure analysis target device, concerning the time when there is a possibility of occurrence of a failure (step S106). Next, the data receiving unit 101 inputs the received data or the like to the identification unit 105.

Next, using the learning model stored in the model storage unit 104, the identification unit 105 identifies a cause of the failure that has occurred and a countermeasure therefor, on the basis of the input data (step S107).

Next, the identification unit 105 outputs information identified in step S107 (Step S108). After outputting the identified information, the failure analysis device 100 completes the failure analysis process.

[Description of Effects]

The model generation unit 103 of the failure analysis device 100 according to the present exemplary embodiment can generate a learning model obtained by heterogeneous mixture learning in which the degree of influence of each of explanatory variables is computed for each of discriminants. Therefore, the identification unit 105 can promptly identify the cause of the failure that has occurred using the computed degree of influence of the explanatory variable.

Furthermore, even when the model generation unit 103 generates a decision tree, the identification unit 105 can narrow down the cause attribute. Therefore, the identification unit 105 can promptly identify the cause of the failure that has occurred.

Furthermore, even when the model generation unit 103 generates a discriminant, the identification unit 105 can narrow down explanatory variables having a large influence on a failure. Therefore, the identification unit 105 can promptly identify the cause of the failure that has occurred on the basis of the explanatory variables of the learning model.

Figure 7:
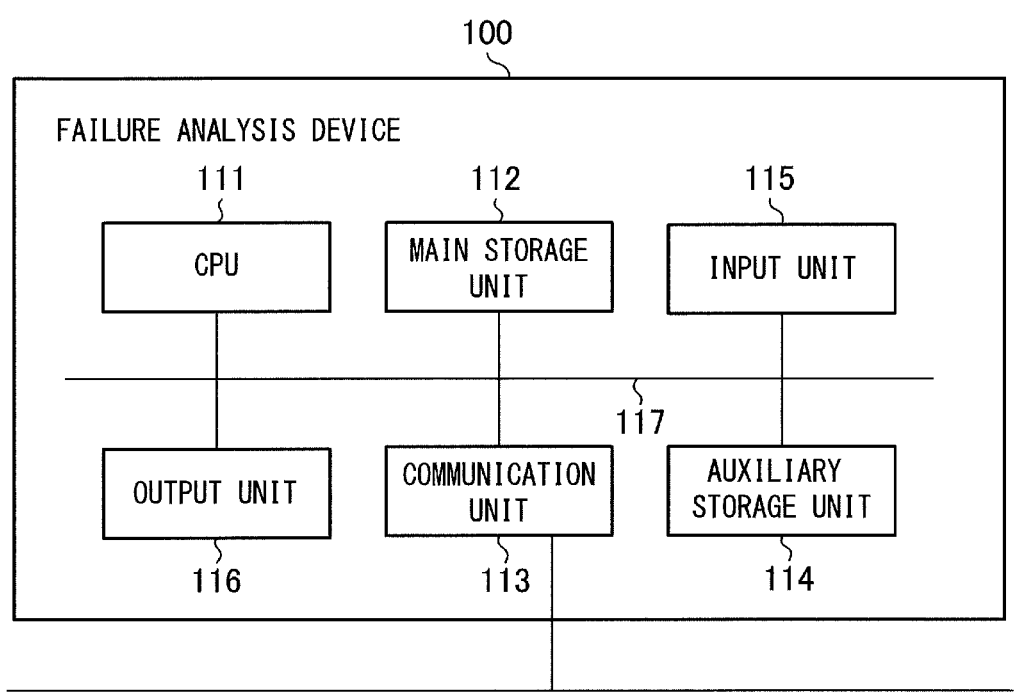
FIG. 7 is an explanatory diagram showing a hardware configuration example of the failure analysis device according to the present invention.

Hereinafter, a specific example of a hardware configuration of the failure analysis device 100 of the present exemplary embodiment will be described. FIG. 7 is an explanatory diagram showing a hardware configuration example of the failure analysis device according to the present invention.

The failure analysis device 100 shown in FIG. 7 includes a central processing unit (CPU) 111, a main storage unit 112, and a communication unit 113, and an auxiliary storage unit 114. Furthermore, the device may include an input unit 115 for the user to operate and an output unit 116 for presenting the processing result or the progress of the processing content to the user.

The main storage unit 112 is used as a data working area and a temporary data save area. The main storage unit 112 is implemented by random access memory (RAM).

The communication unit 113 has a function of performing data input/output with peripheral devices via a wired network or a wireless network (information communication network).

The auxiliary storage unit 114 is a non-transitory tangible storage medium. Examples of the non-transitory tangible storage medium include a magnetic disk, a magneto-optical disk, a compact disc read only memory (CD-ROM), a digital versatile disc read only memory (DVD-ROM), and semiconductor memory.

The input unit 115 has a function of inputting data and processing instructions. The input unit 115 is an input device such as a keyboard or a mouse.

The output unit 116 has a function of outputting data. The output unit 116 is a display device such as a liquid crystal display device or a printing device such as a printer.

In addition, as shown in FIG. 7, individual components of the failure analysis device 100 are connected to a system bus 117.

The auxiliary storage unit 114 stores programs for implementing the data receiving unit 101, the model generation unit 103, and the identification unit 105 shown in FIG. 1, for example.

The main storage unit 112 is used as a storage area of the data storage unit 102 and a storage area of the model storage unit 104. Furthermore, the data receiving unit 101 receives the acquisition target data via the communication unit 113.

Note that the failure analysis device 100 may be implemented by hardware. For example, the failure analysis device 100 may be equipped with a circuit including hardware components such as Large Scale Integration (LSI) containing a program for implementing the functions shown in FIG. 1.

Furthermore, the failure analysis device 100 may be implemented by software by causing the CPU 111 shown in FIG. 7 to execute a program that provides functions of individual components shown in FIG. 1.

In a case where the devices are implemented by software, the CPU 111 loads the program stored in the auxiliary storage unit 114 to the main storage unit 112 and executes the program to control the operation of the failure analysis device 100, thereby implementing individual functions by software.

In addition, a part or all of individual components may be implemented by a general-purpose circuit (circuitry), a dedicated circuit, a processor, or a combination thereof. These may be formed by a single chip or may be formed by a plurality of chips connected via a bus. Some or all of the components may be implemented by a combination of the above-described circuits or the like and a program.

In a case where some or all of the constituent elements are implemented by a plurality of information processing devices and circuits, the plurality of information processing devices and circuits may be centrally arranged or distributed. For example, an information processing device, a circuit, or the like may be implemented as a form in which each component are connected via a communication network, such as a client and server system, a cloud computing system.

Figure 8:
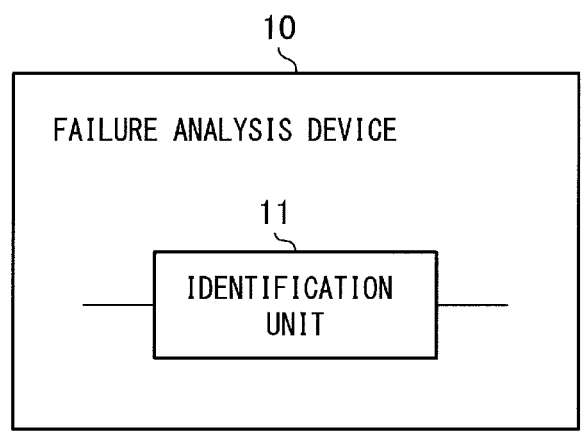
FIG. 8 is a block diagram showing an outline of the failure analysis device according to the present invention.
Figure 9:
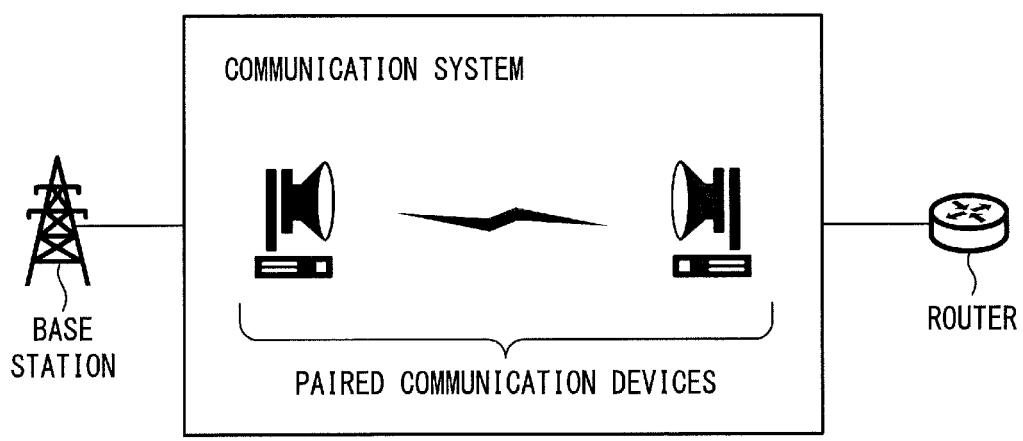
FIG. 9 is a block diagram showing a configuration example of a communication system used to provide a communication service.

Next, a summary of the present invention will be described. FIG. 8 is a block diagram showing an outline of the failure analysis device according to the present invention. A failure analysis device 10 according to the present invention includes an identification unit 11 (for example, the identification unit 105) that discriminates whether a predetermined failure has occurred on the basis of a learning model for discriminating the presence or absence of an occurrence of the predetermined failure learned by using a cause attribute which is associated with a cause of the predetermined failure and on the basis of a value of the attribute, and that identifies the cause of the predetermined failure discriminated to have occurred and countermeasures therefor.

With such a configuration, the failure analysis device can promptly identify a cause of the failure that has occurred and countermeasures therefor.

Furthermore, the failure analysis device 10 may include a learning unit (for example, the model generation unit 103) that performs learning to obtain a learning model by using training data including a plurality of sets of values of a plurality of attributes including a cause attribute and failure occurrence information indicating whether a predetermined failure has occurred.

With such a configuration, the failure analysis device can perform learning to obtain a learning model used to identify the cause of a failure.

Furthermore, it is allowable to use a configuration in which the learning unit generates a binary tree, as a learning model, by defining a condition regarding an attribute as a node other than a leaf node and defining a discriminant for discriminating the presence or absence of an occurrence of the predetermined failure as a leaf node, and the identification unit 11 identifies a discriminant corresponding to the leaf node of the binary tree using a value of the attribute, discriminates whether the predetermined failure has occurred on the basis of the value of the attribute and the discriminant, identifies a cause of the predetermined failure that has been discriminated to have occurred on the basis of a coefficient value of an explanatory variable corresponding to a cause attribute included in the discriminant, and identifies a countermeasure preliminarily associated with the cause.

With such a configuration, the failure analysis device can promptly identify the cause of the failure and countermeasures therefor using a learning model obtained by heterogeneous mixture learning.

Furthermore, it is allowable use a configuration in which the learning unit generates a decision tree, as a learning model, by defining a condition regarding an attribute as a node other than a leaf node and defining information indicating the presence or absence of an occurrence of the predetermined failure as a leaf node, and the identification unit 11 identifies whether the leaf node corresponding to the value of the attribute indicates the occurrence of the predetermined failure on the basis of the value of the attribute and the decision tree, and identifies a cause of the predetermined failure preliminarily associated with the cause attribute used as the condition in nodes from the leaf node to the root node indicating the occurrence of the predetermined failure and countermeasures therefor.

With such a configuration, the failure analysis device can promptly identify a cause of the failure and countermeasures therefor using the binary tree.

Furthermore, it is allowable to use a configuration in which the learning unit generates, as a learning model, a discriminant for discriminating the presence or absence of an occurrence of the predetermined failure, and the identification unit 11 discriminates whether the predetermined failure has occurred on the basis of the value of the attribute and the discriminant, identifies a cause of the predetermined failure that has been discriminated to have occurred on the basis of a coefficient value of an explanatory variable corresponding to a cause attribute included in the discriminant, and identifies a countermeasure preliminarily associated with the cause.

With such a configuration, the failure analysis device can promptly identify a cause of the failure and countermeasures therefor using the discriminant.

Furthermore, the failure analysis device 10 may include a storage unit (for example, the model storage unit 104) that stores a set of a cause, a cause attribute, and a countermeasure for a predetermined failure preliminarily associated with each other.

With such a configuration, the failure analysis device can preliminarily store the relationship between the cause of a predetermined failure, a cause attribute, and a countermeasure for the failure.

While the invention of the present application has been described with reference to the exemplary embodiments and examples, the invention of the present application is not limited to the above exemplary embodiments and examples. Configuration and details of the invention of the present application can be modified in various manners understandable for those skilled in the art within the scope of the invention of the present application.

The above exemplary embodiments may also be partially or entirely described as the following supplementary notes, although this is not a limitation.

(Supplementary Note 1) A failure analysis device including an identification unit which discriminates whether a predetermined failure has occurred on the basis of a learning model for discriminating the presence or absence of an occurrence of the predetermined failure learned by using a cause attribute which is associated with a cause of the predetermined failure and on the basis of a value of the attribute, and that identifies the cause of the predetermined failure discriminated to have occurred and countermeasures therefor.

(Supplementary Note 2) The failure analysis device according to Supplementary Note 1, further including a learning unit which performs learning to obtain a learning model by using training data including a plurality of sets of values of a plurality of attributes including a cause attribute and failure occurrence information indicating whether a predetermined failure has occurred.

(Supplementary Note 3) The failure analysis device according to Supplementary Note 2, in which the learning unit generates a binary tree, as a learning model, by defining a condition regarding an attribute as a node other than a leaf node and defining a discriminant for discriminating the presence or absence of an occurrence of the predetermined failure as a leaf node, and the identification unit identifies a discriminant corresponding to the leaf node of the binary tree using a value of the attribute, discriminates whether the predetermined failure has occurred on the basis of the value of the attribute and the discriminant, identifies a cause of the predetermined failure that has been discriminated to have occurred on the basis of a coefficient value of an explanatory variable corresponding to a cause attribute included in the discriminant, and identifies a countermeasure preliminarily associated with the cause.

(Supplementary Note 4) The failure analysis device according to Supplementary Note 2, in which the learning unit generates a decision tree, as a learning model, by defining a condition regarding an attribute as a node other than a leaf node and defining information indicating the presence or absence of an occurrence of the predetermined failure as a leaf node, and the identification unit identifies whether the leaf node corresponding to the value of the attribute indicates the occurrence of the predetermined failure on the basis of the value of the attribute and the decision tree, and identifies a cause of the predetermined failure preliminarily associated with the cause attribute used as the condition in nodes from the leaf node to the root node indicating the occurrence of the predetermined failure and countermeasures therefor.

(Supplementary Note 5) The failure analysis device according to Supplementary Note 2, in which the learning unit generates, as a learning model, a discriminant for discriminating the presence or absence of an occurrence of the predetermined failure, and the identification unit discriminates whether the predetermined failure has occurred on the basis of the value of the attribute and the discriminant, identifies a cause of the predetermined failure that has been discriminated to have occurred on the basis of a coefficient value of an explanatory variable corresponding to a cause attribute included in the discriminant, and identifies a countermeasure preliminarily associated with the cause.

(Supplementary note 6) The failure analysis device according to any one of Supplementary notes 1 to 5, further including a storage unit which stores a set of a cause, a cause attribute, and a countermeasure for a predetermined failure preliminarily associated with each other.

(Supplementary Note 7) A failure analysis method including: discriminating whether a predetermined failure has occurred on the basis of a learning model for discriminating the presence or absence of an occurrence of the predetermined failure learned by using a cause attribute which is associated with a cause of the predetermined failure and on the basis of a value of the attribute; and identifying the cause of the predetermined failure discriminated to have occurred and countermeasures therefor.

(Supplementary Note 8) The failure analysis method according to Supplementary Note 7, further including performing learning to obtain a learning model by using training data including a plurality of sets of values of a plurality of attributes including a cause attribute and failure occurrence information indicating whether a predetermined failure has occurred.

(Supplementary Note 9) The failure analysis method according to Supplementary Note 8, further including: generating a binary tree, as a learning model, by defining a condition regarding an attribute as a node other than a leaf node and defining a discriminant for discriminating the presence or absence of an occurrence of the predetermined failure as a leaf node; identifying a discriminant corresponding to the leaf node of the binary tree using a value of the attribute; discriminating whether the predetermined failure has occurred on the basis of the value of the attribute and the discriminant; identifying a cause of the predetermined failure that has been discriminated to have occurred on the basis of a coefficient value of an explanatory variable corresponding to a cause attribute included in the discriminant; and identifying a countermeasure preliminarily associated with the cause.

(Supplementary Note 10) The failure analysis method according to Supplementary Note 8, further including: generating a decision tree, as a learning model, by defining a condition regarding an attribute as a node other than a leaf node and defining information indicating the presence or absence of an occurrence of the predetermined failure as a leaf node; identifying whether the leaf node corresponding to the value of the attribute indicates the occurrence of the predetermined failure on the basis of the value of the attribute and the decision tree; and identifying a cause of the predetermined failure preliminarily associated with the cause attribute used as the condition in nodes from the leaf node to the root node indicating the occurrence of the predetermined failure and countermeasures therefor.

(Supplementary Note 11) The failure analysis method according to Supplementary Note 8, further including: generating, as a learning model, a discriminant for discriminating the presence or absence of an occurrence of the predetermined failure; discriminating whether the predetermined failure has occurred on the basis of the value of the attribute and the discriminant; identifying a cause of the predetermined failure that has been discriminated to have occurred on the basis of a coefficient value of an explanatory variable corresponding to a cause attribute included in the discriminant; and identifying a countermeasure preliminarily associated with the cause.

(Supplementary Note 12) A failure analysis program causing a computer to execute: a discrimination process of discriminating whether a predetermined failure has occurred on the basis of a learning model for discriminating the presence or absence of an occurrence of the predetermined failure learned by using a cause attribute which is associated with a cause of the predetermined failure and on the basis of a value of the attribute; and an identifying process of identifying the cause of the predetermined failure discriminated to have occurred and countermeasures therefor.

(Supplementary Note 13) The failure analysis program according to Supplementary Note 12, the program causing a computer to further execute a learning process to obtain a learning model by using training data including a plurality of sets of values of a plurality of attributes including a cause attribute and failure occurrence information indicating whether a predetermined failure has occurred.

(Supplementary Note 14) The failure analysis program according to Supplementary Note 13, the program causing a computer to further, in the learning process, generate a binary tree, as a learning model, by defining a condition regarding an attribute as a node other than a leaf node and defining a discriminant for discriminating the presence or absence of an occurrence of the predetermined failure as a leaf node, and execute, in the identifying process, identify a discriminant corresponding to the leaf node of the binary tree using a value of the attribute, discriminate whether the predetermined failure has occurred on the basis of the value of the attribute and the discriminant, identify a cause of the predetermined failure that has been discriminated to have occurred on the basis of a coefficient value of an explanatory variable corresponding to a cause attribute included in the discriminant, and identify a countermeasure preliminarily associated with the cause.

(Supplementary Note 15) The failure analysis program according to Supplementary Note 13, the program causing a computer to further, in the learning process, generate, a decision tree, as a learning model, by defining a condition regarding an attribute as a node other than a leaf node and defining information indicating the presence or absence of an occurrence of the predetermined failure as a leaf node, and in the identifying process, identify whether the leaf node corresponding to the value of the attribute indicates the occurrence of the predetermined failure on the basis of the value of the attribute and the decision tree, and identify a cause of the predetermined failure preliminarily associated with the cause attribute used as the condition in nodes from the leaf node to the root node indicating the occurrence of the predetermined failure and countermeasures therefor.

(Supplementary Note 16) The failure analysis program according to Supplementary Note 13, the program causing a computer to further, in the learning process, generate, as a learning model, a discriminant for discriminating the presence or absence of an occurrence of the predetermined failure, and in the identifying process, discriminate whether the predetermined failure has occurred on the basis of the value of the attribute and the discriminant, identify a cause of the predetermined failure that has been discriminated to have occurred on the basis of a coefficient value of an explanatory variable corresponding to a cause attribute included in the discriminant, and identify a countermeasure preliminarily associated with the cause.

INDUSTRIAL APPLICABILITY

The present invention is suitably applicable to the use of the maintenance work of a communication system.

REFERENCE SIGNS LIST 10, 100 Failure analysis device
11, 105 Identification unit
101 Data receiving unit
102 Data storage unit
103 Model generation unit
104 Model storage unit
111 CPU
112 Main storage unit
113 Communication unit
114 Auxiliary storage unit
115 Input unit
116 Output unit
117 System bus

What is claimed is:

1. A failure analysis device comprising
a non transitory computer readable medium for storing instructions; and
a processor configured to execute the instructions for:
discriminating an occurrence of a predetermined failure based on a value of an attribute using a learning model for discriminating the occurrence of the predetermined failure, wherein the learning model is trained by using a cause attribute associated with a cause of the predetermined failure, and
identifying the cause of the predetermined failure and a countermeasure therefor.

2. The failure analysis device according to claim 1, wherein the processor is further configured to execute the instructions for:
performing learning to obtain the learning model by using training data including a plurality of sets of values of a plurality of attributes including the cause attribute and failure occurrence information indicating whether the predetermined failure has occurred.

3. The failure analysis device according to claim 2, wherein the processor is further configured to execute the instruction for:
generating a binary tree, as the learning model, by defining a condition regarding each attribute as a non-leaf node and defining a discriminant for discriminating presence or absence of the occurrence of the predetermined failure as a leaf node,
identifying the discriminant corresponding to the leaf node of the binary tree using the value of the attribute,
discriminating the occurrence of the predetermined failure based on the value of the attribute and the discriminant, identifying the cause of the predetermined failure based on a coefficient value of an explanatory variable corresponding to the cause attribute, and identifying the countermeasure preliminarily associated with the cause.

4. The failure analysis device according to claim 2, wherein the processor is further configured to execute the instructions for:

generating a decision tree, as the learning model, by defining a condition regarding each attribute as a non-leaf node and defining information indicating presence or absence of the occurrence of the predetermined failure as a leaf node, identifying whether the leaf node corresponding to the value of the attribute indicates the occurrence of the predetermined failure based on the value of the attribute and the decision tree, and identifying the cause of the predetermined failure preliminarily associated with the cause attribute used as the condition in nodes from the leaf node to a root node indicating the occurrence of the predetermined failure and the countermeasure therefor.

5. The failure analysis device according to claim 2, wherein the processor is further configured to execute the instructions for:

generating, as the learning model, a discriminant for discriminating presence or absence of the occurrence of the predetermined failure, discriminating the occurrence of the predetermined failure based on the value of the attribute and the discriminant, identifying the cause of the predetermined failure based on a coefficient value of an explanatory variable corresponding to the cause attribute, and identifying the countermeasure preliminarily associated with the cause.

6. The failure analysis device according to claim 1, further comprising a storage unit which stores a set of the cause, the cause attribute, and the countermeasure for the predetermined failure preliminarily associated with each other.

7. A failure analysis method comprising:

discriminating an occurrence of a predetermined failure based on a value of an attribute using a learning model for discriminating the occurrence of the predetermined failure, wherein the learning model is trained by using a cause attribute associated with a cause of the predetermined failure; and identifying the cause of the predetermined failure and a countermeasure therefor.

8. The failure analysis method according to claim 7, further comprising performing learning to obtain the learning model by using training data including a plurality of sets of values of a plurality of attributes including the cause attribute and failure occurrence information indicating whether the predetermined failure has occurred.

9. The failure analysis method according to claim 8, further comprising:

generating a binary tree, as the learning model, by defining a condition regarding each attribute as a non-leaf node and defining a discriminant for discriminating presence or absence of the occurrence of the predetermined failure as a leaf node, identifying the discriminant corresponding to the leaf node of the binary tree using the value of the attribute, discriminating the occurrence of the predetermined failure based on the value of the attribute and the discriminant, identifying the cause of the predetermined failure based on a coefficient value of an explanatory variable corresponding to the cause attribute, and identifying the countermeasure preliminarily associated with the cause.

10. The failure analysis method according to claim 8, further comprising:

generating a decision tree, as the learning model, by defining a condition regarding each attribute as a non-leaf node and defining information indicating presence or absence of the occurrence of the predetermined failure as a leaf node, identifying whether the leaf node corresponding to the value of the attribute indicates the occurrence of the predetermined failure based on the value of the attribute and the decision tree, and identifying the cause of the predetermined failure preliminarily associated with the cause attribute used as the condition in nodes from the leaf node to a root node indicating the occurrence of the predetermined failure and the countermeasure therefor.

11. The failure analysis method according to claim 8, further comprising:

generating, as the learning model, a discriminant for discriminating presence or absence of the occurrence of the predetermined failure, discriminating the occurrence of the predetermined failure based on the value of the attribute and the discriminant, identifying the cause of the predetermined failure based on a coefficient value of an explanatory variable corresponding to the cause attribute, and identifying the countermeasure preliminarily associated with the cause.

12. A non-transitory computer-readable capturing medium having captured therein a failure analysis program causing a computer to execute:

a discrimination process of discriminating an occurrence of a predetermined failure based on a value of an attribute using a learning model for discriminating the occurrence of the predetermined failure, wherein the learning model is trained by using a cause attribute associated with a cause of the predetermined failure; and an identifying process of identifying the cause of the predetermined failure and a countermeasure therefor.

13. The non-transitory computer-readable capturing medium according to claim 12, the program causing a computer to further execute a learning process to obtain the learning model by using training data including a plurality of sets of values of a plurality of attributes including the cause attribute and failure occurrence information indicating whether the predetermined failure has occurred.

14. The non-transitory computer-readable capturing medium according to claim 13, the program causing a computer to further in the learning process, generate a binary tree, as the learning model, by defining a condition regarding each attribute as a non-leaf node and defining a discriminant for discriminating presence or absence of the occurrence of the predetermined failure as a leaf node, in the identifying process, identifying the discriminant corresponding to the leaf node of the binary tree using the value of the attribute, discriminating the occurrence of the predetermined failure based on the value of the attribute and the discriminant, identifying the cause of the predetermined failure based on a coefficient value of an explanatory variable corresponding to the cause attribute, and identifying the countermeasure preliminarily associated with the cause.

15. The non-transitory computer-readable capturing medium according to claim 13, the program causing a computer to further in the learning process, generate a decision tree, as the learning model, by defining a condition regarding each attribute as a non-leaf node and defining information indicating presence or absence of the occurrence of the predetermined failure as a leaf node, and in the identifying process, identify whether the leaf node corresponding to the value of the attribute indicates the occurrence of the predetermined failure based on the value of the attribute and the decision tree, and identify the cause of the predetermined failure preliminarily associated with the cause attribute used as the condition in nodes from the leaf node to a root node indicating the occurrence of the predetermined failure and the countermeasure therefor.

16. The non-transitory computer-readable capturing medium according to claim 13, the program causing a computer to further in the learning process, generate, as the learning model, a discriminant for discriminating presence or absence of the occurrence of the predetermined failure, and in the identifying process, discriminate the occurrence of the predetermined failure based on the value of the attribute and the discriminant, identify the cause of the predetermined failure based on a coefficient value of an explanatory variable corresponding to the cause attribute, and identify the countermeasure preliminarily associated with the cause.

* * * * *